(12) United States Patent
Prochazka

(10) Patent No.: US 6,809,898 B1
(45) Date of Patent: Oct. 26, 2004

(54) DISK DRIVE ROCKING MODE VIBRATION DAMPER

(75) Inventor: Vaclav Prochazka, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/483,265

(22) Filed: Jan. 13, 2000

(51) Int. Cl.$^7$ .......................... G11B 17/02; F16C 35/06
(52) U.S. Cl. .................. 360/99.08; 310/90; 384/536
(58) Field of Search .................. 360/99.08, 98.07, 360/97.02; 310/51, 91, 67 R, 90; 384/490, 512, 513, 536, 535

(56) References Cited

U.S. PATENT DOCUMENTS

| | | | | |
|---|---|---|---|---|
| 3,483,407 A | * | 12/1969 | Frohmuller et al. ........... | 310/51 |
| 3,784,267 A | * | 1/1974 | Davis ........................... | 384/453 |
| 4,285,016 A | * | 8/1981 | Gilovich ...................... | 360/84 |
| 4,334,718 A | * | 6/1982 | Hirt et al. .................... | 310/90.5 |
| 4,713,703 A | * | 12/1987 | Asano ....................... | 360/99.08 |
| 4,779,165 A | * | 10/1988 | Elsaesser et al. ........ | 360/97.02 |
| 4,810,108 A | * | 3/1989 | Yajima ........................ | 384/488 |
| 4,855,857 A | | 8/1989 | Ono et al. ................... | 360/133 |
| 4,905,110 A | | 2/1990 | Krum et al. .............. | 360/99.08 |
| 4,928,029 A | * | 5/1990 | Wright ......................... | 310/89 |
| 4,942,219 A | | 7/1990 | Yatsuka et al. ............. | 528/272 |
| 5,045,738 A | * | 9/1991 | Hishida et al. ................ | 310/90 |
| 5,183,863 A | | 2/1993 | Nakamura et al. ........... | 525/438 |
| 5,204,567 A | | 4/1993 | Kinoshita et al. ............. | 310/90 |
| 5,214,549 A | | 5/1993 | Baker et al. ............. | 360/97.02 |
| 5,365,388 A | | 11/1994 | Maughan et al. ........ | 360/99.04 |
| 5,425,584 A | * | 6/1995 | Ide ............... | 384/99 |
| 5,430,589 A | | 7/1995 | Moir et al. ............... | 360/97.02 |
| 5,463,861 A | * | 11/1995 | Lorenz ........................ | 57/339 |
| 5,483,397 A | | 1/1996 | Gifford et al. ........... | 360/97.01 |
| 5,606,475 A | * | 2/1997 | Ishizuka .................. | 360/99.08 |
| 5,619,389 A | * | 4/1997 | Dunfield et al. ......... | 360/98.07 |
| 5,727,882 A | * | 3/1998 | Butler et al. ................. | 384/611 |
| 5,798,887 A | * | 8/1998 | Yoshida et al. .......... | 360/99.08 |
| 5,802,837 A | * | 9/1998 | Paweletz et al. .............. | 57/406 |
| 5,816,712 A | * | 10/1998 | Brown et al. ................ | 384/536 |
| 5,821,646 A | * | 10/1998 | Chuta et al. ............... | 310/67 R |
| 5,880,545 A | * | 3/1999 | Takemura et al. ............ | 310/90 |
| 5,882,122 A | * | 3/1999 | Noguchi et al. ............ | 384/490 |
| 6,104,570 A | * | 8/2000 | Pelstring .................. | 360/98.07 |
| 6,137,196 A | * | 10/2000 | Kurasawa ..................... | 310/51 |
| 6,149,382 A | * | 11/2000 | Englander et al. ............ | 415/90 |
| 6,339,515 B2 | * | 1/2002 | Lee et al. ................. | 360/99.08 |
| 6,373,655 B1 | * | 4/2002 | MacLeod et al. ........ | 360/99.08 |

FOREIGN PATENT DOCUMENTS

| | | | | |
|---|---|---|---|---|
| JP | 59-76558 | * | 5/1984 | |
| JP | 11-62953 | * | 3/1999 | |

\* cited by examiner

*Primary Examiner*—Brian E. Miller
(74) *Attorney, Agent, or Firm*—Sheridan Ross P.C.

(57) ABSTRACT

A computer disk drive assembly is provided having a vibration damper for reducing transducer/track misregistration errors and acoustical noise in a computer disk drive having a rotating shaft. The disk drive generally includes a flexible interconnection between a base assembly and a bearing assembly, in combination with a rigid interconnection between the base assembly and the bearing assembly. By attenuating the amplitude of vibrations in the disk drive, the present invention allows for increased track densities and produces less acoustical noise than undamped disk drives.

23 Claims, 4 Drawing Sheets

DISK DRIVE ROCKING MODE VIBRATION DAMPER

FIELD OF THE INVENTION

The present invention relates to a method and apparatus for damping rocking mode vibrations in rotating devices. In particular, the present invention relates to a rocking mode vibration damper for computer disk drives.

BACKGROUND OF THE INVENTION

Disk drive memory systems are used in personal computer applications to store digital information on magnetic disks. In a typical disk drive assembly, information is stored on the disks in concentric tracks divided into sectors. The disks themselves are mounted on a hub, which rotates relative to the disk drive enclosure. Information is accessed by means of read/write heads mounted on pivoting arms that move radially over the surface of the disks. This radial movement of the transducer heads allows different tracks to be accessed. The disks are rotated by an electric motor to allow the read/write head to access different sectors on the disks. The motor is typically mounted within or beneath the hub, and usually rotates the disks at from 1,200 to 12,000 revolutions per minute.

Vibrations in a disk drive occur as a result of several influences. Defects in the ball bearings interconnecting the rotating hub to the disk drive enclosure are a first cause of vibrations. Ball bearings are not perfectly spherical and generally they contain some defects such as flat spots, crevices, or the like. Similarly, ball bearing races may also contain defects. Consequently, the movement of the hub as the bearing passes each defect produces an excitation which generates vibration in the hub. Because there will be several bearing defect frequencies associated with each hub speed, a multitude of ball bearing excitation frequencies can result, producing vibrations in the disk drive assembly. Environmental vibrations or shocks are another cause of vibration in computer disk drives. Sources of environmentally-induced vibrations include physical jarring of the disk drive installed in a computer, or any movement of the computer enclosing the disk drive. Deformations of the disk drive enclosure or base plate, known as vertical diaphragm vibrations, are yet another cause of vibrations in computer disk drives.

Three modes of vibration may occur in a spinning disk and hub assembly. The first mode of vibration for the disk and hub is in a radial direction relative to the axis of rotation. The second mode of vibration for the disk and hub is in an axial direction relative to the axis of rotation. The third mode of vibration is a rocking displacement of the disk and hub relative to the axis of rotation. When these vibrations are of sufficient amplitude, they can cause servo system errors and transducer/track misregistrations, thereby decreasing or inhibiting drive performance.

Every rotating disk drive inherently has an upper and lower rocking mode vibration. This rocking mode vibration is the result of the manufacturing tolerances of the bearing itself and the structural stiffness of the spindle motor and the disk drive housing or enclosure. Thus, any disk drive hub will exhibit specific upper and lower rocking resonances, the frequency of which will change depending upon the number of disks supported by the spindle, as well as the rotational speed of the hub. The rocking resonance can be affected by defects in the disk drive assembly bearings. In particular, the frequency of the vibrations caused by the disk drive assembly bearings can resonate with the natural rocking mode frequency of the disk drive assembly and result in high amplitude vibrations. These high amplitude vibrations can cause data misregistration errors as the storage disks rock beneath the read/write head. In addition, such nonrepetitive runout, if it occurs during servo or data write operations, can later reduce the track following capability of the disk drive during read operations. This in turn can lead to read/write head servo system failure or an increase in acoustical noise. Therefore, reductions in rocking mode vibrations and/or bearing defect vibrations can reduce disk drive errors, can lead to longer read/write head servo system life, and can reduce the level of noise produced by the disk drive. Also, the amplitude of these vibrations is directly associated with drive performance. In drives where the amplitude is kept relatively small, data can be stored in higher densities than in drives where such vibrations have a relatively large amplitude.

The frequencies at which the rocking mode and bearing defect vibrations interact will vary, depending on the particular set of bearings used in the drive and the geometry of the drive itself. The number and thickness of storage media disks carried by a disk drive also affects the frequencies at which rocking mode vibrations occur. For example, where a disk drive structure is used to carry from one to four storage media disks and is used in a first family of drives operated at a first speed and a second family of drives operated at a second speed, there are 16 upper and lower dynamic rocking mode frequencies. In addition, there are two distinct sets of bearing defect frequencies. Therefore, it is virtually impossible to avoid all harmful frequency interactions using a single disk drive design for a family of multiple disk disk drives. As a result, disk drive manufacturers are compelled to use a wide variety of spindle motor designs to accommodate the various disk drive platforms and performance standards that comprise their product lines while simultaneously attempting to minimize the effects of vibration.

The structure of the disk drive also has a significant effect on the amplitude of vibrations resulting from rocking mode and vertical diaphragm mode resonant frequency vibrations. Undamped structures tend to exhibit vibrations having a higher amplitude at their resonant frequencies than do equivalent structures that contain damping means. Consequently, for a given vibrational input (e.g. from spindle bearing defects) an undamped and rigid disk drive assembly will produce larger amplitude vibrations in the disk storage media at resonant frequencies than will equivalent disk drives having damping means. Conversely, disk drive assemblies having damping typically exhibit resonant frequencies of a lower amplitude. Because of the relatively low amplitude of the vibrations in a damped drive, data storage densities may be increased compared to undamped drives.

The natural resonance of the disk drive assembly during normal operation is also a major source of acoustical noise. The reduction of acoustical noise is an increasingly important consideration in the design of computer disk drives. In particular, where the computer disk drive is for use in computers placed in work spaces, it is desirable that the disk drive have a very low acoustical noise signature. By reducing the amplitude of the resonant frequencies in a disk drive assembly, damping lowers the acoustical noise signature of the assembly.

Efforts to dampen vibrations in disk drive assemblies have included the insertion of damping material between the spindle and the drive enclosure. An example of such an approach is found in U.S. Pat. No. 5,483,397 to Gifford et al. However, this approach cannot be applied to disk drive designs having rotating shafts. Other designs have attempted to reduce vibrations by mounting the stator of the disk drive spindle motor to the base through a damping material. This approach is taken in U.S. Pat. No. 5,365,388 to Maughan et al. Although such a design is useful at damping vibrations occurring in the stator, it is incapable of damping rocking mode vibrations set up in the rotating spindle and hub. Also, such a design requires more space than an otherwise identical design not having damping material. This is a disadvantage because disk drives increasingly must provide greater storage capacity and smaller form factors.

In light of the above-described problems, including those of misregistration errors and acoustical noise, it would be useful to find a way to avoid or dampen vibrations generated due to natural rocking resonances and bearing defect frequencies in a disk drive assembly. Furthermore, it would be useful to shift the frequencies of the natural rocking modes to prevent the overlap of these rocking mode frequencies with the bearing defect frequencies at the operating speed of the disk drive assembly. In addition, it would be useful to provide a disk drive assembly that could be used over a range of disk drives, containing differing numbers of storage media disks. Furthermore, it would be advantageous to provide a disk drive assembly that is capable of accommodating variations in the rotational speed of the storage media and various types of bearings, and to avoid or dampen the effects of vibration overall.

SUMMARY OF THE INVENTION

In accordance with the present invention, a method and apparatus for damping vibrations in a computer disk drive is disclosed. More particularly, the present invention dampens vibrations in disk drive assemblies having a rotating shaft. In such devices, the rotating shaft interconnects the base of the disk drive assembly and the rotating hub. Typically, the hub and spindle rotate in unison with the rotating portions of a bearing assembly that is directly or indirectly affixed to the base plate of the drive. In a preferred embodiment, the bearing assembly is supported in the disk drive enclosure by damping material at a first portion, and by direct interconnection to the base at a second portion. The damping material thus may be interposed at an interface between the stationary portion of the bearing assembly, such as an outer race of a ball bearing, and the base of the disk drive apparatus.

The damping material interposed between the stationary base and the rotating spindle can be provided in a variety of forms. According to one embodiment of the present invention the damping material is an elastic O-ring. According to another embodiment of the present invention, the damping material is a damping adhesive. The precise composition of the damping material is relatively unimportant, so long as it is capable of absorbing and dissipating vibrational energy. Therefore, suitable materials include rubber, urethane, plastic, or any elastomeric or viscoelastic material.

According to a first embodiment, the disk drive assembly of the present invention includes a bearing assembly that is flexibly interconnected to the base assembly at a first portion, the flexible interconnection being through a damping material, and rigidly interconnected to the base at a second portion. In this way, large amplitude vibrations can be damped by the damping material, while maintaining a precise relationship between the spindle and the base assembly. According to this embodiment, the damping material is provided in the form of an O-ring. The rigid interconnection between the bearing assembly and the base is made at a level corresponding to the plane of the base underlying the stator assembly. The O-ring vibration damper of the flexible interconnection is generally located within a diameter described by a sleeve that extends from the base to receive the bearing assembly. Between the flexible interconnection and the rigid interconnection of the base sleeve and the bearing assembly is a gap that allows the bearing assembly to move relative to the base sleeve. Energy associated with this motion is absorbed by the damping material, thereby reducing the amplitude of the vibrations.

In another embodiment of the present invention, the base of the disk drive assembly has integral to it a sleeve to receive a bearing assembly. According to this embodiment, at a first end proximate to the base, the sleeve has a diameter greater than the bearing assembly. At a second end, distal from the base, the sleeve has a reduced inner diameter, corresponding to the diameter of the bearing assembly. Thus, when the bearing assembly is fully inserted in the base sleeve, a gap exists at the end of the sleeve corresponding to the base, while the end distal from the base is in closely fitting contact with the bearing assembly. Damping material is interposed in at least a portion of the gap between the base sleeve and the bearing assembly. According to this embodiment, the damping material may be provided in the form of an O-ring. Grooves may be provided in the base sleeve, the bearing housing, or both, to locate the damping material.

According to yet another embodiment of the present invention, a disk drive assembly is provided having a base sleeve with an increased interior diameter at a portion distal from the base. At a portion of the base sleeve interior to the base itself, the diameter of the base sleeve is reduced such that it can receive a bearing assembly in closely fitting contact. A layer of damping material is interposed within the gap formed between the distal portion of the base sleeve and the constant diameter bearing assembly. According to this embodiment, the damping material may be a damping adhesive.

A further embodiment of the present invention discloses a disk drive assembly having a base sleeve with a large diameter lower portion, adjacent to the base, and a reduced diameter upper portion. The base sleeve receives a bearing assembly or cartridge having a constant diameter approximately equal to the reduced diameter distal portion of the base sleeve. Upon insertion into the base sleeve, the bearing housing is in closely fitting contact with the distal portion of the base sleeve, and a gap exists between the bearing housing and the proximal portion of the base sleeve. Inserted into this gap is damping material, to absorb energy from vibrations between the base sleeve and the bearing housing. According to this embodiment, the damping material may be a damping adhesive placed on the large diameter interior of the base sleeve before the bearing housing is positioned in the sleeve.

The unique method and apparatus for reducing vibration in a disk drive assembly provided by the present invention has a number of advantages. According to the present invention, while vibrational energy is absorbed and the amplitude of vibrations therefore reduced, the positioning of the components relative to one another can be maintained with high precision. Furthermore, by absorbing vibrational energy, the acoustical noise of the disk drive assembly is reduced. The present invention also allows the density of data tracks on disk storage media to be increased as a result of the decreased amplitude of drive vibrations. Also, the present invention provides a disk drive assembly having a rotating shaft design in which vibrational energy is dampened.

The present invention allows for the damping of vibrations in a computer disk drive assembly, even where a rotating shaft is utilized. Additional advantages of the present invention will become readily apparent from the following discussion, particularly when taken together with the accompanying drawings.

DETAILED DESCRIPTION OF THE INVENTION

In accordance with the present invention, a method and apparatus for damping vibrations in a disk drive is provided.

Figure 1:
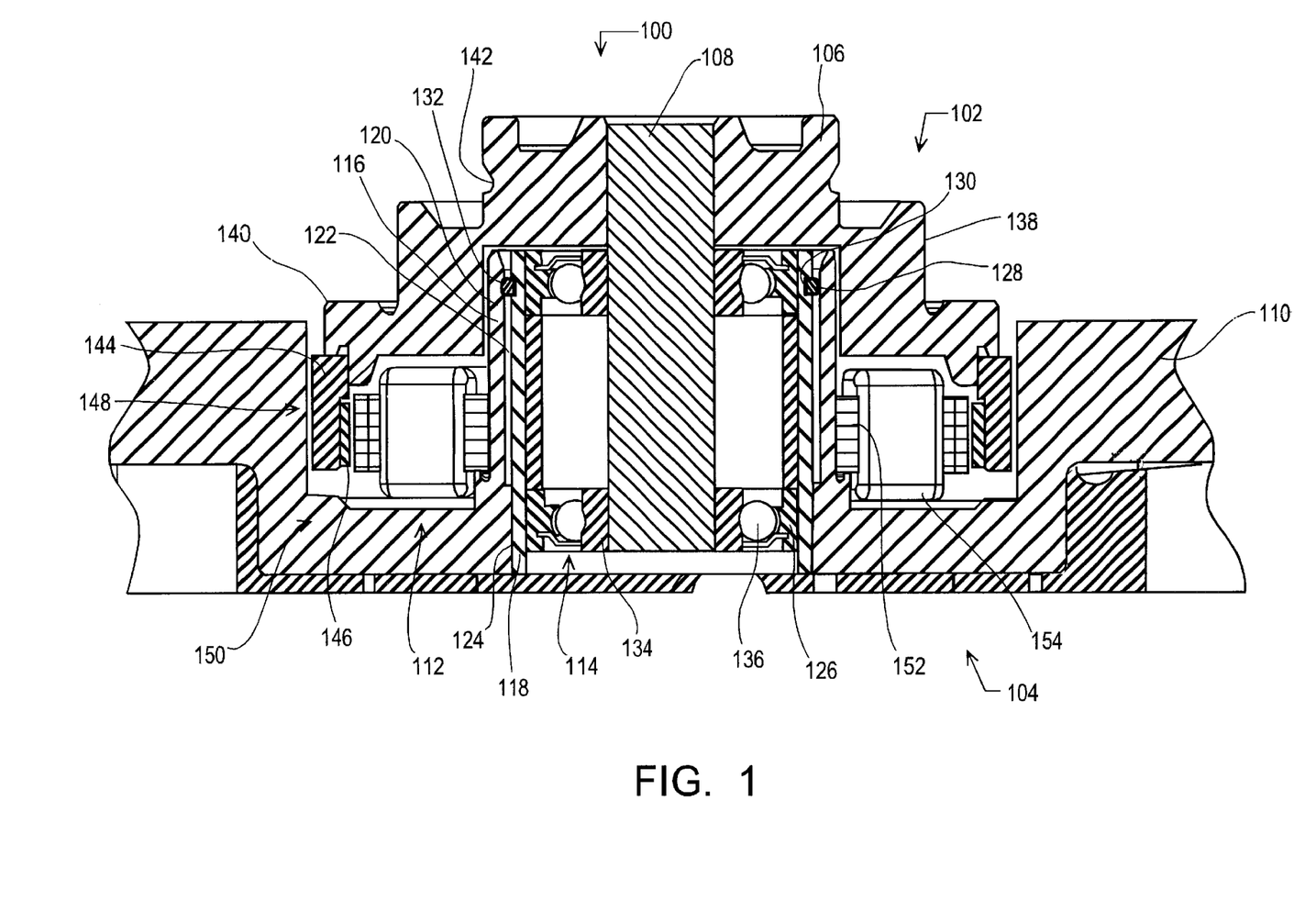
FIG. 1 is a cutaway view of a disk drive assembly incorporating a vibration damper in accordance with one embodiment of the present invention.

With reference to FIG. 1, a disk drive assembly incorporating a vibration damper is illustrated. The disk drive assembly 100 generally includes a rotating hub assembly 102 and a stationary base assembly 104. The rotating hub assembly 102 generally includes a hub 106 and a rotating shaft 108. The base assembly 104 generally includes a base 110, only partially illustrated in FIG. 1, and a stator assembly 112. A bearing assembly 114 rotatably interconnects the rotating hub assembly 102 and the base assembly 104.

The base 110 includes a sleeve 116 that is adapted to receive a bearing cartridge 118. The sleeve 116 comprises an upper section 120 having a relatively large inside diameter such that a gap 122 is formed between the upper portion 120 of the sleeve 116 and the bearing cartridge 118. The lower portion 124 of the sleeve 116 is adapted to receive a portion of the bearing cartridge 118 in closely fitting contact. The bearing cartridge 118 contains the outer bearing races 126 of the bearing assembly 114. These outer bearing races 126 are pressed or glued into the bearing cartridge 118 such that they remain stationary with respect to the base assembly 104.

Located within the gap 122 is a vibration damper 128. The vibration damper 128 is in the shape of an O-ring. In the preferred embodiment, it has a circular cross section, although other cross-sectional shapes will work. The vibration damper 128 is carried in a slot 130 formed about the circumference of the bearing cartridge 118. Therefore, the vibration damper 128 is in contact with the bearing cartridge 118 on an inside diameter of the vibration damper 128. On an outside diameter, the vibration damper 128 is in contact with the upper portion 120 of the sleeve 116. The sleeve 116 may also be provided with a groove or slot 132 for receiving the vibration damper 128.

The hub assembly 102 includes a rotating hub 106 rigidly affixed to a rotating shaft 108. About the circumference of the rotating shaft 108 are inner bearing races 134. The inner bearing races 134 have a concave surface about an outside diameter that, in cooperation with a similar concave surface about an inside diameter of the outer bearing races 126, retains the ball bearings 136. Accordingly, the rotating shaft 108 is rotatably interconnected to the base 110 through the bearing assembly 114.

The hub 106 includes a receiving surface 138 for mating with an inside diameter of storage disks (not shown). The hub 106 further includes a flange 140 on top of which the storage disks may be stacked. The storage disks are held in place by a retainer (not shown) that is received by a retaining clamp slot 142 formed in the hub 106.

Generally located below the flange 140 of the hub 106 is the back iron 144. The back iron 144 is generally cylindrical in shape, and is rigidly affixed to the hub 106. Affixed to the back iron 144 are magnets 146. The magnets 146 and the back iron 144 combine to form the rotor 148 of the electric motor 150 that rotates the hub assembly 102 in relation to the base assembly 104 when the disk drive assembly 100 is in operation.

The stator 112 of the electric motor 150 is comprised of laminations 152 and coils 154. When an electrical current is sent through the coils 154, a magnetic field is set up that interacts with the magnetic field produced by the magnets 146 of the rotor 148. The magnetic field produced by the coils 154 is generally directed by the laminations 152.

The construction of the disk drive assembly 100 serves to dampen the amplitude of vibrations that would otherwise occur in the device due to interaction of the device's natural resonant frequencies and the frequencies of vibrations set up by defects in the bearings or by vibrations introduced from external sources. This is because the bearing cartridge 118 is rigidly mounted or affixed to the base 110 at a lower portion 124 of the base sleeve 116, and flexibly interconnected to the base 110 at the interface between the upper portion 120 of the base sleeve 116 and the bearing cartridge 118 of the bearing assembly 114 through damping material 128 interposed at that interface. The damping material 128 is selected to absorb the energy of vibrations that are transmitted through it. By absorbing energy, the damping material 128 reduces the amplitude of vibrations. Accordingly, variations in the radial and vertical position of the data tracks in relation to the read/write heads are reduced, allowing greater track densities and reducing misregistration errors. In addition, acoustical noise is reduced. In the illustrated embodiment, the rigid connection between the lower portion 124 of the bearing cartridge 118 and the base 110 ensures that, in normal operation the rotating spindle 108 and the associated storage disks are held in precise relationship to the stationary base components 104 of the drive 100. However, in alternative embodiments, damping material 128 may comprise the entire connection between the bearings 114 and the base assembly 104.

The damping material 128 is generally any energy-absorbing material. Therefore, the damping material 128 may be any elastic or viscoelastic material. Suitable materials include rubber, urethane, or plastic. In addition to absorbing vibrational energy, the damping material 128 selected for use in the disk drive assembly 104 should be resistant to the effects of heat in its ability to absorb vibrations, and should be resistant to outgassing. According to a preferred embodiment, the damping material 128 is rubber.

Figure 2:
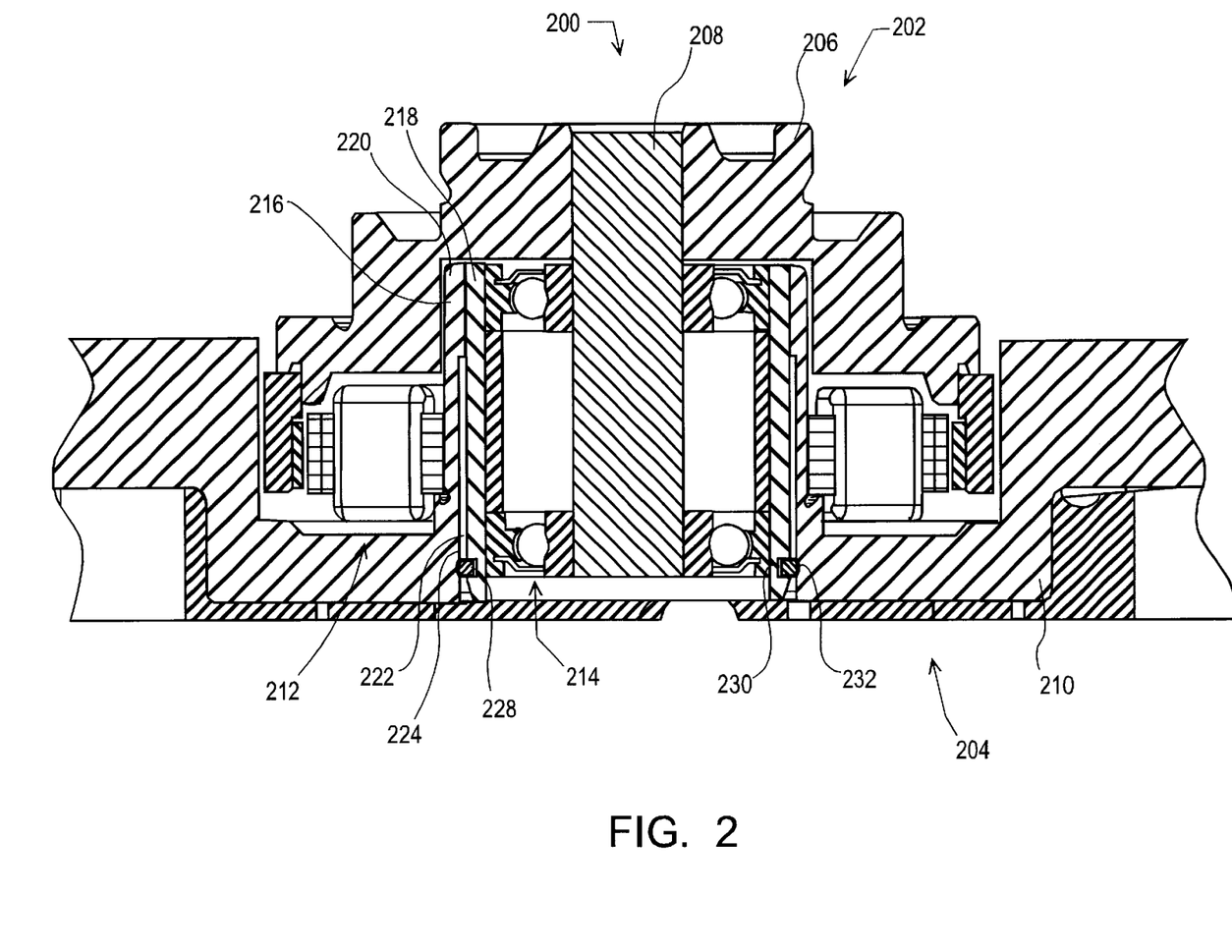
FIG. 2 is a cutaway view of a disk drive assembly incorporating a vibration damper according to another embodiment of the present invention.

Referring now to FIG. 2, an additional embodiment of the present invention is identified as disk drive assembly 200. The disk drive assembly 200, in a design that is similar to the above-described disk drive assembly 100, generally includes a hub assembly 202 and a base assembly 204. These subassemblies are rotatably interconnected by bearings 214. The rotating hub assembly 202 generally includes a hub 206 and a rotating shaft 208. The base assembly 204 generally includes a base 210 and a stator assembly 212 fixed to the base 210.

A sleeve 216 is integral to the base 210. The sleeve 216 is generally cylindrical in shape, and is adapted to receive a bearing cartridge 218. The sleeve 216 includes an upper section 220, distal from the base 210 and having a reduced inside diameter. According to the illustrated embodiment, the inside diameter of the distal portion 220 of the sleeve 216 is approximately equal to the outside diameter of the bearing cartridge 218. A gap 222 is formed between a lower 224 or proximal portion of the sleeve 216 and the bearing cartridge 218. The gap 222 provides a space in which the bearing cartridge 218 can move relative to the sleeve 216. Inserted in a portion of the gap 222 between the sleeve 216 and the bearing cartridge 218 is a damper 228. The damper 228 in the illustrated embodiment has a circular cross section and an annular overall shape. The damping material 228 extends about the circumference of the bearing cartridge 218. In the illustrated embodiment, the vibration damper 228 is carried in a groove or slot 230 formed in the bearing cartridge 218. An additional or alternative groove or slot 232 for locating the vibration damper 228 may be formed in the inside diameter of the proximal portion 224 of the base sleeve 216.

It can be seen that the disk drive assembly 200 includes bearings 214 that are rigidly mounted to the base 210 at a distal portion 220 of the sleeve 216, and flexibly mounted to the base 210 at a proximal portion 224 of the sleeve 216 through the vibration damper 228. The embodiment illustrated in FIG. 2 is particularly desirable because any rocking motions in the disk drive assembly 200 result in smaller variations in the radial and vertical positions of the data tracks on the disk drive media relative to the transducer head than in the embodiment illustrated in FIG. 1. This is because any rocking motion of the rotating hub assembly 202 tends to occur about the portion of the bearing cartridge 218 that is rigidly mounted to the base 210 at the distal portion 220 of the base sleeve 216. Therefore, the axis of rocking is closely aligned with the storage media, and the magnitude of rocking seen by the transducer heads is accordingly reduced as compared to the embodiment illustrated in FIG. 1.

Figure 3:
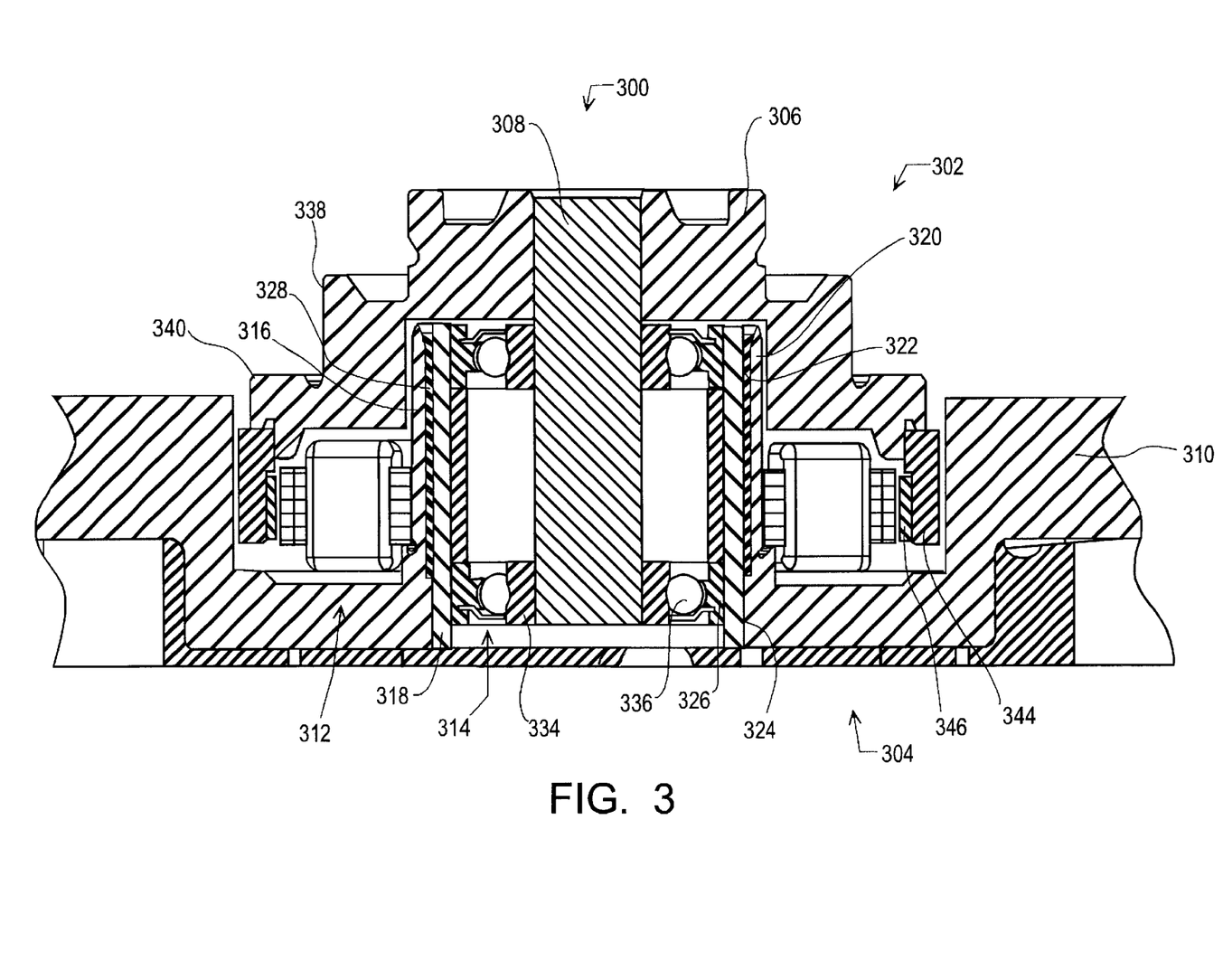
FIG. 3 is a cutaway view of a disk drive assembly incorporating a vibration damper according to yet another embodiment of the present invention.

Referring now to FIG. 3, a further embodiment of the present invention is generally identified as disk drive assembly 300. As with the other described embodiments of the present invention, the disk drive assembly 300 generally includes a hub assembly 302 and a base assembly 304. The hub assembly 302 comprises a hub 306 interconnected to a rotating shaft 308. The base assembly 304 generally includes a base 310 and a stator assembly 312. The rotating hub assembly 302 is interconnected to the stationery base assembly 304 by a bearing assembly 314. The bearing assembly 314 generally includes the bearing cartridge 318, outer bearing races 326, inner bearing races 334, and ball bearings 336.

The base 310 features a sleeve 316 that, according to the present embodiment, is cylindrical in shape. The base sleeve 316 receives the bearing cartridge 318. The inside diameter of the base sleeve 316 is slightly larger than the outside diameter of the bearing cartridge 318 over a distal portion 320 of the sleeve 316. At a proximate or lower portion 324 of the sleeve 316, the interior diameter of the sleeve 316 is about equal to the outside diameter of the bearing cartridge 318. Accordingly, the bearing cartridge 318 is rigidly attached to the base 310 at a lower portion 324 of the base sleeve 316.

Between the upper portion 320 of the base sleeve 316 and the bearing cartridge 318 is a gap 322. According to this embodiment of the present invention, the gap 322 is filled with a damping material 328. In an alternative embodiment, the gap 322 may be only partially filled with the damping material 328. The damping material 328 may be applied as a damping adhesive prior to the insertion of the bearing cartridge 318 into the base sleeve 316. Alternatively, the damping material 328 may be provided in the form of an elastic sleeve or other pre-formed material.

As with the above-described embodiments, the hub 306 includes a flange 340 and an alignment surface 338 for receiving storage media disks (not shown). Additionally, the rotating hub 306 carries a back iron 344 to which magnets 346 are affixed. The back iron 344 and the magnets 346 are generally arrayed in a circle about the stator 312 of the base assembly 304.

Also, as with other described embodiments of the present invention, the disk drive assembly 300 provides a disk drive in which vibrations are attenuated and dampened, thereby reducing their amplitude. Additionally, the acoustical noise produced by the disk drive 300 is less than that of a drive not incorporating damping material. The disk drive assembly 300 allows for the use of damping material 328 that is applied to the component parts of the disk drive assembly 300 in viscous liquid form. According to an alternative embodiment, the damping material 328 may be a damping adhesive, or may be any molded or formed material capable of dissipating vibrational energy. According to one embodiment, the damping material 328 is NIPOL SBR NS-112, available from Nippon Zeon Co., Ltd.

Figure 4:
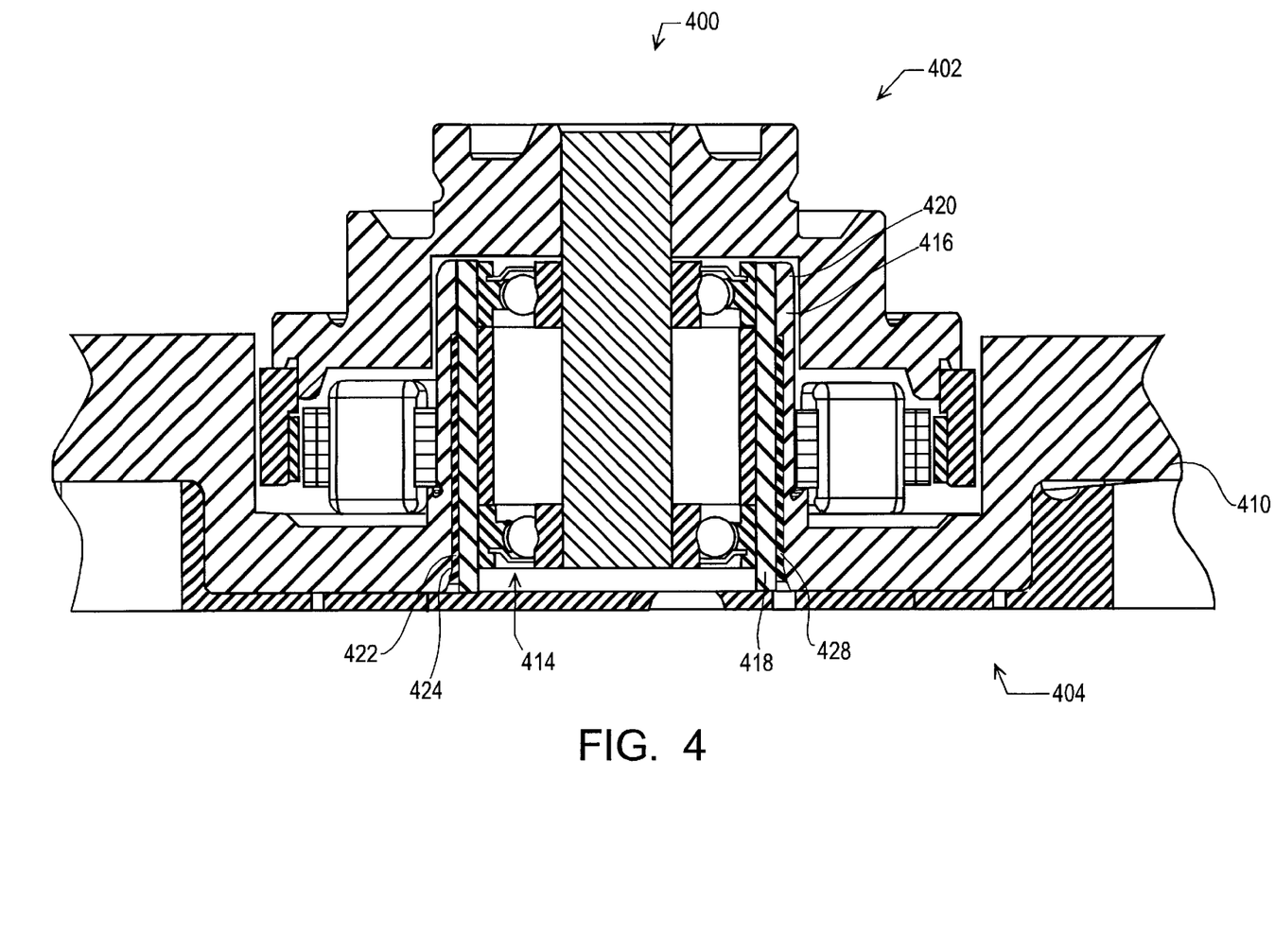
FIG. 4 is a cutaway view of a disk drive assembly having a vibration damper according to a further embodiment of the present invention.

Referring now to FIG. 4, a disk drive constructed in accordance with the present invention is generally identified as disk drive 400. The disk drive assembly 400 is similar to the above-described embodiments of the present invention, and in particular is similar to the disk drive assembly 300 illustrated in FIG. 3. Because of the great similarities between the disk drive assembly 400 and the above-described embodiments, the following description will concentrate on the features unique to this embodiment.

The base 410 of the disk drive 400 includes a sleeve 416 that is integral to the base 410 and that rises from the base 410 to form a generally cylindrical receptacle. The sleeve 416 receives a bearing cartridge 418. At an upper or distal portion 420, the sleeve 416 has an inside diameter that is approximately equal to the outside diameter of the bearing cartridge 418. Accordingly, at distal portion 420, the sleeve 416 is in closely fitting contact with the bearing cartridge 418, forming a generally rigid mount. At a lower or proximal portion 424, the inside diameter of the sleeve 416 is larger than the outside diameter of the bearing cartridge 418, and is therefore spaced apart from the cartridge 418, to form a gap 422. A damping material 428 is interposed between the sleeve 416 and the bearing cartridge 418 to substantially fill the gap 422. Accordingly, a flexible interconnection between the sleeve 416 and the bearing cartridge 418 is formed adjacent to the proximal portion 424 of the sleeve 416. This design is particularly useful in reducing misregistration errors, because the center axis of the rocking mode vibrations is aligned with central portions of the stack of storage disks (not shown). Therefore, movement of the storage disks relative to the transducer heads is reduced.

In accordance with the present invention, a disk drive incorporating a rocking mode vibration damper is provided. The invention in its broader aspects relates to a disk drive assembly that incorporates damping material and that allows for a rotating shaft design. Additionally, the present invention allows for disk type storage drives having an improved capacity by decreasing nonrepeatable runout in the drive. Furthermore, the present invention provides a disk drive having attenuated acoustical noise.

The foregoing description of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include alternative embodiments to the extent permitted by the prior art.

What is claimed is:

1. A disk drive comprising:
   a base;
   a bearing assembly housed within a cartridge having a single wall and interconnected to said base;
   damping material interposed at an interface between said base and said bearing assembly, wherein at a first portion said cartridge wall is flexibly interconnected to said base through said damping material, and wherein at a second portion said cartridge wall is rigidly interconnected to said base; and
   a rotating shaft rotatably interconnected to said base by said bearing assembly.

2. The disk drive of claim 1, wherein a gap exists between said cartridge wall and said base at a location between said first portion of said cartridge wall and said second portion of said cartridge wall.

3. The disk drive of claim 1, further comprising a rotating hub fixed to said rotating shaft.

4. The disk drive of claim 1, wherein said bearing assembly comprises ball bearings.

5. The disk drive of claim 1, wherein said damping material is an O-ring.

6. The disk drive of claim 1, wherein said damping material is a damping adhesive.

7. The disk drive of claim 1, wherein said damping material is an energy absorbing material.

8. The disk drive of claim 1, wherein said damping material is selected from the group including elastomerics, viscoelastics and urethanes.

9. The disk drive of claim 1, wherein said bearing assembly comprises at least one outer bearing race, and wherein said outer bearing race is rigidly interconnected to said cartridge wall.

10. A vibration damping motor bearing apparatus for use in a disk drive assembly, comprising:
    a base flexibly interconnected, to a first sleeve of a bearing assembly at a first location and rigidly interconnected to said first sleeve of said bearing assembly at a second location;
    a rotating shaft interconnected to said bearing assembly, wherein said rotating shaft is rotatably interconnected to said base; and
    damping material interposed between said base and said first sleeve of the bearing assembly at said first location.

11. The vibration damping motor bearing apparatus of claim 10, wherein said bearing assembly includes first and second outer bearing races, wherein said first sleeve is affixed to an outside portion of said first and second outer bearing races.

12. The vibration damping motor bearing apparatus of claim 10, wherein said first sleeve is separated from said base by a gap at a third location.

13. The vibration damping motor bearing apparatus of claim 10, wherein said damping material is an O-ring.

14. The vibration damping motor bearing apparatus of claim 10, wherein said damping material is a damping adhesive.

15. The vibration damping motor bearing apparatus of claim 10, wherein said damping material is an energy absorbing material.

16. A computer disk drive, comprising:
    a base;
    a rotating shaft;
    bearing means disposed between said base and said rotating shaft;
    said bearing means interconnecting said rotating shaft to said base, wherein said bearing means includes a first cylindrical cartridge, and wherein said first cylindrical cartridge of said bearing means is rigidly received by and in contact with said base; and
    means for flexibly interconnecting said base to said bearing means, wherein said means for flexibly interconnecting is in contact with said base and with said first cylindrical cartridge of said bearing means, whereby said first cylindrical cartridge of said bearing means is flexibly interconnected to said base.

17. The computer disk drive of claim 16, flier comprising electrical motor means for rotating said shaft relative to said base.

18. The computer disk drive of claim 16, wherein said means for flexibly receiving comprises means for damping vibrations.

19. A method for reducing vibrations in a computer disk drive, comprising:
    rotatably interconnecting a rotating shaft to a stationary base with a bearing assembly, the bearing assembly including an outer wall and a bearing race rigidly interconnected to said outer wall;
    interconnecting said outer wall of said bearing assembly to the stationary base through damping material at a first location, wherein said outer wall of said bearing assembly is in contact with said damning material at said first location;
    interconnecting said outer wall of said bearing assembly to the stationary base at a second location, wherein said outer wall is in contact with said stationary base at said second location, wherein said stationary base is flexibly interconnected to said outer wall at the first location, and wherein said stationary base is rigidly interconnected to said outer wall at the second location.

20. The method for reducing vibrations in a computer disk drive of claim 19, wherein said damping material comprises an elastic material interposed between said bearing and said stationary base.

21. A disk drive comprising:
    a base;
    a bearing assembly housed within a cartridge and interconnected to said base;
    damping material interposed at an interface between said base and said bearing assembly, wherein at a first portion said cartridge is flexibly interconnected to said base through said damping material, and wherein at a second portion said cartridge is rigidly interconnected to said base;
    a rotating shaft rotatably interconnected to said base by said bearing assembly; and
    further comprising a stator assembly, wherein said second portion of said cartridge rigidly interconnected to said base is in a plane corresponding to the plane of said base underlying said stator assembly.

22. A disk drive comprising:

a base;

a bearing assembly housed within a cartridge and interconnected to said base, wherein said cartridge includes an outer cartridge wall;

damping material interposed at an interface between said base and said outer cartridge wall, wherein said outer cartridge wall is in contact with said damning material, wherein at a first portion said outer cartridge wall is flexibly interconnected to said base through said damping material, and wherein at a second portion said outer cartridge wall is in contact with and is rigidly interconnected to said base; and a rotating shaft rotatably interconnected to said base by said bearing assembly.

23. A disk drive comprising:

a base;

a bearing assembly including an outer bearing race and a cartridge wall attached to the outer bearing race, said cartridge wall attached to the outer bearing race being connected to the base with a first flexible connection at a first location along an axis of rotation of said bearing assembly and with a second rigid connection at a second location alone said axis of rotation of said bearing assembly, wherein said first and second locations lie in different planes, and wherein said different planes are perpendicular to said axis of rotation of said bearing assembly; and a rotating shaft interconnected to said base by said bearing assembly.

* * * * *

UNITED STATES PATENT AND TRADEMARK OFFICE
CERTIFICATE OF CORRECTION

PATENT NO. : 6,809,898 B1
DATED : October 26, 2004
INVENTOR(S) : Prochazka

It is certified that error appears in the above-identified patent and that said Letters Patent is hereby corrected as shown below:

Column 10,
Line 25, delete "flier" and insert -- further -- therefor;
Line 40, delete "damning" and insert -- damping -- therefor;

Column 11,
Line 10, delete "damning" and insert -- damping -- therefor;

Column 12,
Line 9, delete "alone" and insert -- along -- therefor;

Signed and Sealed this

Twenty-eighth Day of December, 2004

JON W. DUDAS
*Director of the United States Patent and Trademark Office*